Patented Dec. 11, 1934

1,983,972

UNITED STATES PATENT OFFICE 1,983,972

MANUFACTURE OF RUBBER AND ARTICLES THEREOF

Mario Faldini, Milan, Italy, assignor to Società Italiana Pirelli, Milan, Italy, a company of Italy No Drawing. Original application June 24, 1931, Serial No. 546,669. Divided and this application July 7, 1932, Serial No. 621,309. In Great Britain August 13, 1930

9 Claims. (Cl. 18—50)

This invention relates to the direct production of rubber and rubber articles by deposition from rubber latex and like natural or artificial aqueous dispersions of rubber, gutta percha, balata or the like, and has for its object to provide an improved process which will result in enhanced smoothness and softness of texture of the rubber produced.

In my co-pending application, Serial No. 546,669 of which this is a division, I have described a process for the manufacture of a composition of brown substitute (factice) for direct addition to aqueous dispersions of rubber or the like, the characteristic feature of which process consists in emulsifying a vulcanized fatty oil while in a fluid (unsolidified) state with an aqueous solution or dispersion of a dispersing agent. According to a preferred form of the process, a fatty oil is vulcanized by treatment with sulphur at an elevated temperature, and while the vulcanized oil is still at a sufficiently elevated temperature (for example, 90–100° C.) to be fluid, the cooling and consequent solidification of the fluid is intercepted by an emulsification of the oil with an aqueous solution or dispersion of a dispersing agent, so as to produce an emulsion which is first fluid and then gradually becomes viscous until after a period of 48 hours or so it assumes a paste-like consistency.

According to the present invention, a process for the direct production of rubber or rubber articles by coagulation-deposition from an aqueous colloidal dispersion of rubber, gutta percha, balata or the like (hereinafter referred to generically as "rubber") is characterized by the use, as the deposition-dispersion, of a mixed dispersion of rubber latex or a like aqueous colloidal dispersion of rubber, with an aqueous emulsion of vulcanized oil produced by the process above referred to, that is to say, the process described in the aforesaid United States application, Serial No. 546,669.

It has been found that by employing a mixed deposition-dispersion of this particular composition, the rubber which is produced is characteristically possessed of an enhanced degree of smoothness and softness of texture, and is generally of improved quality, as compared with rubber produced from mixed dispersions obtained by dispersing in latex or the like ordinary rubber substitute, that is to say, rubber substitute which has been allowed to cool and solidify before dispersion in the latex and even as compared with rubber which has been produced from a mixed dispersion of rubber latex or the like with a vulcanized emulsion of oil, that is to say, an oil emulsion which has been vulcanized subsequently to the step of emulsification of the parent oil.

This advantageous effect appears to be largely due to the enhanced degree of interdispersion of the components of the mixed dispersion which is used according to the present invention, as compared with the known mixed dispersion just referred to.

The invention has particular application to the process of rubber deposition described in the specification of United States Patent No. 1,717,248 and similarly to the later processes described in the specifications of British Patent No. 292,964 and United States Patents Nos. 1,792,702, 1,750,540 and 1,811,695.

It is a characteristic feature of all of these specific processes that an aqueous deposition-dispersion is employed which is stable against coagulation at ordinary temperatures but more or less suddenly becomes unstable upon the temperature of the dispersion being raised to a predetermined degree, and that coupled with the use of such a heat-sensitized dispersion, the heat for destabilization and consequent coagulation of the rubber is effected through the deposition base upon which a layer of rubber is to be formed, the result of such local heating of the body of dispersion being the formation upon the surface of the deposition base of a layer of compact rubber, the thickness of which depends, inter alia, upon the duration of contact of the heated base with the dispersion.

For brevity, a process of this general type will hereinafter be referred to simply as a "heat-deposition process".

The coagulant which is used in such a process and the presence of which is responsible for the heat-sensitivity of the dispersion, is a coagulant of the type that when added in suitable small proportion, does not at ordinary temperature produce coagulation and at the most incurs a decrease in fluidity, but on appropriate application of heat promotes more or less rapid thickening followed by coagulation. Suitable coagulants of this type include both organic and inorganic substances and among these are generally to be found those bodies which when introduced in large quantities into latex are apt to coagulate it.

Appropriate inorganic coagulants of the type in question include salts of di-valent bases, such as salts of magnesium, calcium (for example, calcium sulphate), zinc, and ammonium salts of strong acids used in conjunction with oxides of metals of fixed bivalency of Group II of the Periodic Scheme of lower solubility in water, i. e., those oxides whose solubility in the hydrated state (hydroxides) does not at 95° C. exceed 2 per cent. in weight of the solution. Said oxides may be used in a proportion of from about 8–25 grams per litre of the latex. This is the proportion found to be generally utilizable with satisfactory results, but may, of course, be varied according to necessity.

The oxides (or hydroxides) of strontium and barium have a dispersing action instead of a thickening and coagulating effect; while mercury oxide is inactive.

Oxides of the type of calcium oxide by reason of their ready hydration are not to be distinguished for the purpose in question from the hydroxides; but in the case of others it is doubtful whether they act in the form of hydroxides, and when added in such form are frequently found much less active than the parent oxides. It is therefore advisable always to use the hydrated oxide as such, although a simple preliminary experiment will suffice to determine the activity or otherwise of the form of any given oxide available, as well as the most advantageous proportion to employ of the particular reagent.
The most active oxides are those of magnesium, calcium and zinc and such are the preferred co-operative agents for use with the ammonium salts.

Examples of suitable ammonium salts are ammonium chloride, sulphate and nitrate; and the proportion employed may be from about 10 to 30 grams per litre of the latex. As in the case of the oxides, this represents the generally applicable proportion, and may, likewise, be varied according to need.

Mixtures of salts such as those of di- and trivalent bases may be employed, and also the oxides of the said class may be used individually or in admixture along with ammonium salts.
Among suitable organic coagulants for use in the specific processes referred to above are aromatic disubstituted guanidines, for example, symm.-diphenylguanidine, symm.-phenyl-o-tolylguanidine, and symm.-di-o-tolylguanidine, and such may be employed in the proportion of from 0.5 to 2.5 per cent.

Such reagents may be added in solution or in suspension in water or other distributing agent or in a latex preservative such as aqueous ammonia, when the latex is unpreserved or is deficient in preservative for the purpose in view.

If, for example, there be added to rubber latex, at a temperature below about 20° C., a very small quantity of a salt of the type described, for example, 3 grams of calcium sulphate dissolved or suspended in water per 1000 grams of dry residue of the latex, or one or other of the alternative coagulants or coagulant mixtures mentioned in an appropriate proportion as aforesaid, there may be some thickening, but coagulation does not take place, and if the proportion of coagulant has been suitably adjusted, which is a matter of simple preliminary experiment, the system may be preserved unaltered at or below the temperature stated for a considerable period of time, but if the latex so-treated be brought to a higher temperature below the point of ebullition, for example, to a temperature between 75° and about 100° C.—according to the nature of the latex and the proportion of the coagulant, the degree of thickening increases as the temperature is raised, and with the duration of the heating, until compact coagulation of the rubber takes place.

By operating in accordance with this heat-deposition process, articles of the most diverse kinds are readily obtainable, such, for example, as rubber sheet, rubberized fibres and fabrics, caps, gloves, teats, rods, threads, tubing and inner tyre tubes. In the case of tubing, a method which may conveniently be employed is the method described in the aforesaid United States specification No. 1,792,702, according to which, a heated cylindrical core is moved through a body of heat-sensitized dispersion at such a rate as to emerge therefrom coated with a layer of compact coagulum. This method has the advantage that it permits a comparatively small dispersion bath to be used for the manufacture of articles of relatively large size. A curved core may be used in the method, and it is possible readily to manufacture inner tubes and other tubular articles of either straight or circular form, for example, endless form, and having walls of variable thickness.

Now, it has been found that when attempting to incorporate into the deposition-dispersion which is used in this process, a proportion of rubber substitute of the customary milled form with the aid as usual of a dispersing agent, the quantity of dispersing agent generally requisite is frequently prohibitive, for in these heat-deposition processes, the heat-destability of the dispersion is dependent not only upon the nature of the coagulant present, but also upon the quantity thereof in the dispersion, and, if to counter-act the effect of the relatively large quantity of dispersion agent necessarily introduced into the dispersion when employing milled substitute, a correspondingly larger quantities of coagulant be employed, it is generally impossible to keep within the operative limits of coagulant proportions for the successful operation of the process.

In the particular form of substitute emulsion, however, which is referred to above, that is to say, the substitute emulsion the manufacture of which is described in my co-pending application Serial No. 546,669, the quantity of dispersing agent employed to produce a satisfactory emulsion is so small as to enable the emulsion to be readily incorporated with rubber latex or the like in the deposition-dispersion of a heat-deposition process; that is to say, the quantity of dispersing agent thereby introduced adventitiously into the dispersion is quite compatible with the permissible quantity of coagulant used in the process.

According to a further feature of the present invention, therefore, in a process of manufacture of rubber or rubber articles, of the heat-deposition type, there is used as the deposition-dispersion a mixed dispersion of rubber with an aqueous stable emulsion of pre-vulcanized oil emulsified while still sufficiently hot from the vulcanizing step to be fluid.

It is generally the case when operating the heat-deposition process that the collection of the rubber upon the deposition base tends to proceed less advantageously with latex of normal rubber content, that is to say, latex containing up to about 38% of dry rubber, than with concentrated latex. Thus, with a normal latex, the formation of the rubber film or deposit at the heated surface of the deposition base tends to take place more slowly and to a relatively limited degree as regards the thickness of the deposit, as compared with the use of concentrated latex. In such case, it may be advantageous to treat the dispersion according to the invention described in United States specification No. 1,811,695, that is to say, to subject the latex, prior to the introduction of the coagulant thereto, to a period of moderate heating, for example, of 40–60° C., followed by cooling.

The dispersing agent for the emulsification of the vulcanized oil may be one of the protective colloids frequently employed in the rubber industry as stabilizers for rubber latex. Thus, the said dispersing agent may be a fatty acid, a resin soap, saponin, casein, Turkey red oil, or the like employed in the form of an aqueous solution or dispersion.

The proportion of dispersing agent, relatively to the quantity of vulcanized oil to be emulsified, may vary within fairly wide limits, according to the particular agent used, and a rule is not to be formulated. Thus, in the case of soap, the quantity of soap may vary from 4–12%, in the case of casein, from 2–10% and in the case of saponin, from 0.5–4% reckoned on the weight of the vulcanized oil. These quantities, as will be appreciated, are quite small, compared with the amounts of dispersing agent usually employed in the dispersion of milled solid substitute. A simple preliminary experiment will suffice in any given case, to determine a suitable proportion of the dispersing agent as well as the most advantageous operative conditions generally for the preparation of the emulsion.

The invention will now be further described with reference to the following examples:—

Example I

An emulsified substitute dispersion was first prepared as follows:—85 kgs. of colza oil and 15 kgs. of elemental sulphur were heated together with stirring for 5 hours at about 150° C. and the still-fluid mass was then slowly poured into a homogenizing plant into which were simultaneously introduced 40 kgs. of a 3% aqueous solution of saponin. There resulted a still-fluid somewhat viscous substance, which, on a second passage through the plant, effected at once, commenced to display an increase in viscosity. This product was left to stand for 48 hours, at the end of which time it assumed a paste-like consistency.

A mixed deposition-dispersion was then prepared by intimately admixing the following ingredients:—

Normal rubber latex (containing approximately 33% of dry rubber) _____ 10 kgs.
Emulsified substitute (prepared as above and containing about 75% of vulcanized oil) _____ 2 kgs.

Sulphur _____ ⎫            ⎧ 60 grams
Zinc oxide _____ ⎬ dispersed  ⎨ 100 grams
Ultra accelerator _____ ⎬ in water   ⎨ 10 grams
Calcium sulphate _____ ⎭            ⎩ 50 grams From this mixed dispersion a finger stall was produced by immersing in the dispersion for a period of 10 seconds a stainless steel former previously heated to 95° C.

The resulting deposit of rubber on the finger stall former was a uniform coating of about 1 mm. in thickness, and after drying and vulcanization, the finished finger stall was exceedingly soft and smooth to the touch.

Example II

A mixed deposition-dispersion was made up as follows:—

Concentrated rubber latex (containing about 50% dry rubber) _____ 10 kgs.
Emulsified substitute (prepared as above described and containing about 75% of vulcanized oil) _____ 3 kgs.
Calcium carbonate (in fine subdivision) __ 3 kgs.

Sulphur _____ ⎫            ⎧ 60 grams
Zinc oxide _____ ⎬ dispersed  ⎨ 100 grams
Ultra accelerator _____ ⎬ in water   ⎨ 10 grams
Organic dyestuff _____ ⎬            ⎨ 10 grams
Calcium sulphate _____ ⎭            ⎩ 50 grams The resulting mixed dispersion was used for the production of articles of various kinds, including, for example, bathing caps, tobacco pouches and hand-grips, by the heat-deposition process aforesaid, that is to say, by immersing into the dispersion a heated former of shape corresponding to the desired ultimate shape of the article to be produced.

The rubber deposit on the former, after drying and vulcanization was, in each case, of extreme smoothness and softness of texture.

Example III

A mixed deposition-dispersion was prepared of the following composition:—

Concentrated rubber latex (75% dry rubber) _____ 7.5 kgs.
Emulsified substitute (as before) _____ 3.75 kgs.

Sulphur _____ ⎫ dispersed  ⎧ 120 grams
Zinc oxide _____ ⎬ in water   ⎨ 120 grams
Ultra accelerator _____ ⎭            ⎩ 30 grams This mixed dispersion was then employed to rubberize various fabric materials, such as cotton, silk, wool and the like, by impregnation and spreading, and the rubberized material, after vulcanization in the usual way, was remarkably soft and smooth to the touch.

Example IV

An emulsion of vulcanized oil was first prepared as follows:—85 kgs. of colza oil and 15 kgs. of elemental sulphur were heated together with stirring for 5 hours at about 150° C. The mixing was allowed to cool to 95° C. and the still-fluid mass was then slowly poured into an homogenizing plant into which were simultaneously introduced 100 kgs. of a 10% solution of casein and ammonia water. There resulted a viscous fluid, which was passed a second time through the plant. The viscosity of this fluid slightly increased on standing for 48 hours.

A mixed deposition-dispersion was then made up as follows:—

Concentrated rubber latex (60% dry rubber) _____ 12 kgs.
Emulsified substitute (prepared as immediately above described) _____ 5 kgs.

Sulphur _____ ⎫ dispersed  ⎧ 100 grams
Zinc oxide _____ ⎬ in water   ⎨ 150 grams
Uultra accelerator ____ ⎭            ⎩ 15 grams Gloves were then produced by immersing a suitably heated former into this mixed dispersion, drying the resulting deposit of rubber on the former and vulcanizing the dried deposit. The finished gloves presented, as in the case of the articles produced in the previous examples, a high degree of softness and smoothness of texture.

Example V

A mixed deposition-dispersion was prepared of the following composition:—

| | |
|---|---|
| Concentrated latex (about 50% dry rubber) | 10 kgs. |
| Emulsified substitute (prepared as in Example I and containing about 75% vulcanized oil) | 3 kgs. |

| | | |
|---|---|---|
| Sulphur | dispersed in water | 60 grams |
| Zinc oxide | | 200 grams |
| Ultra accelerator | | 10 grams |
| Organic dyestuff | | 10 grams |
| Ammonium sulphate | | 75 grams |

This dispersion was used for the formation of variously shaped articles by immersing appropriate heated formers into the dispersion. The dispersion was also employed in that known form of the heat-deposition process, according to which the heat-sensitized latex dispersion is forced through a heated extrusion nozzle.

The products which were obtained were consistently of fine smooth texture, exceedingly soft to the touch.

In the following statement of claim, the expression "fluid pre-vulcanized oil" is employed. It is to be understood that this expression is intended to connote that the pre-vulcanized oil (that is to say, the oil that is vulcanized prior to emulsification) is in a fluid state when emulsified.

What I claim and desire to secure by Letters Patent is:—

1. A process of the heat-deposition type, hereinbefore defined, for the direct production of rubber or rubber articles, which consists in admixing together an aqueous dispersion of rubber, an aqueous stable emulsion of unsolidified brown substitute and a coagulant of the heat-activated type, so as to produce a heat-sensitized mixed dispersion, and thereafter immersing a heated deposition base into the dispersion to produce thereon by local heating of the dispersion at the surface of the base a layer of compact rubber coagulum.

2. A process as specified in claim 1, wherein the coagulant employed is a salt of a bivalent metal.

3. A process as specified in claim 1, wherein the coagulant employed is calcium sulphate.

4. A process as specied in claim 1, wherein the coagulant employed is an ammonium salt of a strong acid in conjunction with an oxide of a metal of fixed bivalency of Group II of the Periodic System, whose solubility in the hydrated state does not at 95° C. exceed 2% in weight of the solution.

5. A process as specified in claim 1, wherein the coagulant employed is a mixture of ammonium sulphate and an oxide of a metal of fixed bivalency of Group II of the Periodic System, whose solubility in the hydrated state does not at 95° C. exceed 2% in weight of the solution.

6. A process as specified in claim 1, wherein the coagulant employed is a mixture of an ammonium salt of a strong acid and an oxide of zinc.

7. A process as specified in claim 1, wherein the coagulant employed is an aromatic disubstituted guanidine.

8. A process as specified in claim 1, wherein the coagulant used is an aromatic disubstituted guanidine employed in a proportion of 0.5 to 2.5% reckoned on the total weight of the dispersion.

9. A process for the direct production of rubber or rubber articles by coagulation-deposition from an aqueous rubber dispersion, which consists in forming a mixture of an aqueous heat-sensitized dispersion of rubber and an aqueous stable emulsion of unsolidified brown substitute and bringing the mixture into contact with a heated deposition base to produce thereon at the surface of the base a layer of rubber coagulum.

MARIO FALDINI.